(12) United States Patent
Heistermann

(10) Patent No.: US 12,353,700 B2
(45) Date of Patent: Jul. 8, 2025

(54) DIAGRAM NAVIGATION

(71) Applicant: Oracle International Corporation, Redwood Shores, CA (US)

(72) Inventor: Horst Heistermann, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 18/228,577

(22) Filed: Jul. 31, 2023

(65) Prior Publication Data

US 2025/0044928 A1 Feb. 6, 2025

(51) Int. Cl.
*G06F 3/04855* (2022.01)
*G06F 3/0481* (2022.01)

(52) U.S. Cl.
CPC ........ *G06F 3/04855* (2013.01); *G06F 3/0481* (2013.01); *G06F 2203/04804* (2013.01); *G06F 2203/04806* (2013.01)

(58) Field of Classification Search
CPC .. G06F 3/04855; G06F 3/0485; G06F 3/0481; G06F 2203/04804; G06F 2203/04806
USPC ................................................ 715/700–866
See application file for complete search history.

(56) References Cited

U.S. PATENT DOCUMENTS

| | | | | |
|---|---|---|---|---|
| 8,607,156 B1* | 12/2013 | Jania | .................... | G06F 3/04855 715/974 |
| 2004/0190011 A1* | 9/2004 | Walker, Jr. | ............ | G06F 40/106 358/1.18 |
| 2012/0042278 A1* | 2/2012 | Vaisanen | ............... | G06F 3/0485 715/863 |
| 2014/0108997 A1* | 4/2014 | Beaver | .................. | G06F 3/0488 715/784 |
| 2014/0173532 A1* | 6/2014 | Ikeda | .................... | G06F 3/0485 715/863 |
| 2015/0205476 A1* | 7/2015 | Kuscher | ................ | G06F 3/0485 715/784 |
| 2017/0083224 A1* | 3/2017 | Banerjee | ............. | G06F 3/0483 |
| 2019/0251884 A1* | 8/2019 | Burns | ...................... | G09G 5/14 |

* cited by examiner

*Primary Examiner* — Daniel Samwel
(74) *Attorney, Agent, or Firm* — Hickman Becker Bingham Ledesma LLP

(57) ABSTRACT

Techniques for navigating interactive diagrams are provided. In one technique, a first content of an interactive diagram is presented in a content display area of a user interface. The interactive diagram also includes second content that is outside the content display area of the user interface. A boundary is identified that encapsulates the first content and the second content. While displaying a scrolling control on the user interface, first user input is received that causes a portion of the second content to be presented in the content display area and a portion of the first content to no longer be presented in the content display area. In response receiving second user input to view a portion of the interactive diagram that is outside the boundary, a visual appearance of one or more elements of the scrolling control is updated.

20 Claims, 5 Drawing Sheets

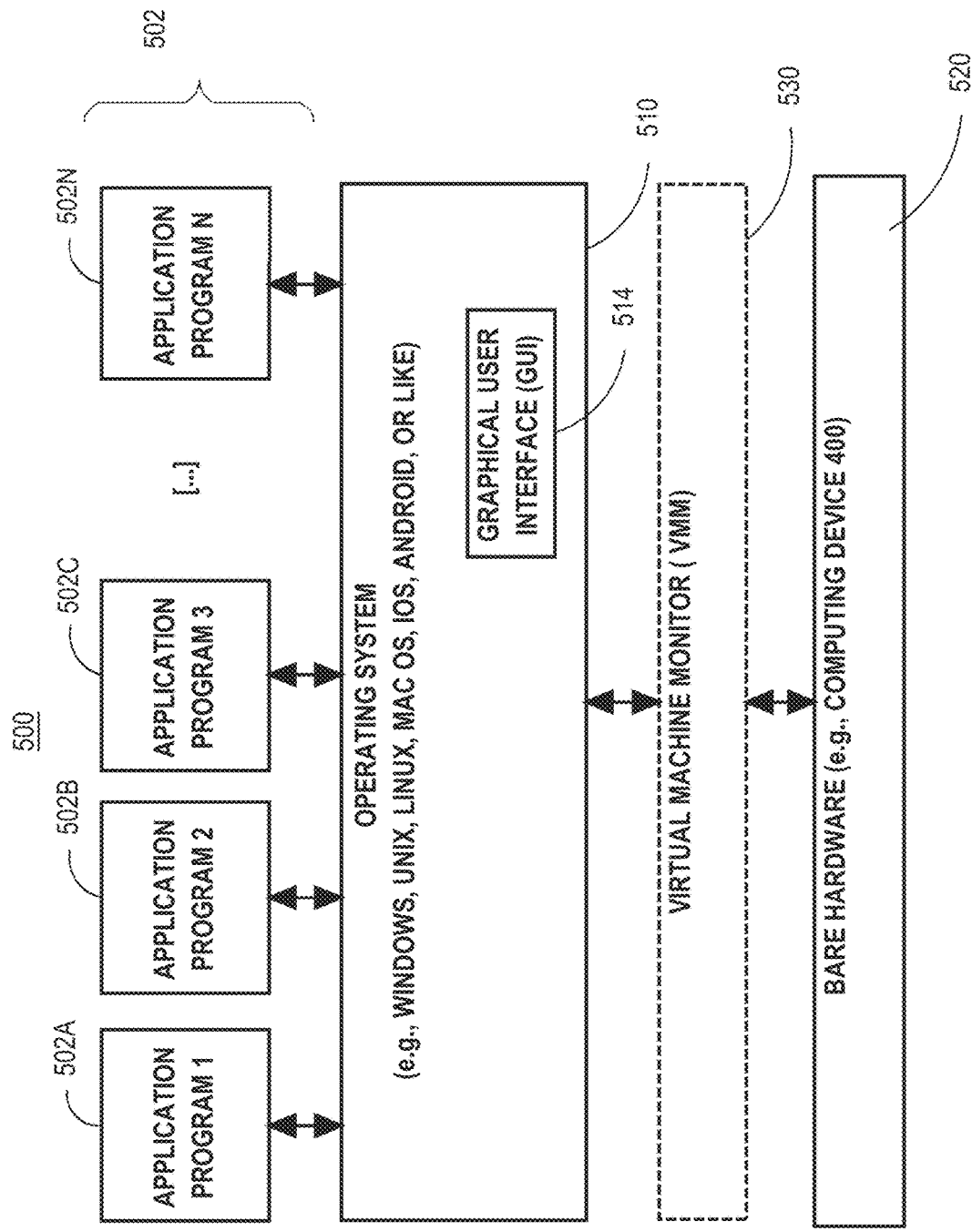

DIAGRAM NAVIGATION

TECHNICAL FIELD

The present disclosure to interactive diagrams and, in particular, to a graphical user interface system and method for navigating within interactive diagrams.

BACKGROUND

User interfaces for digital content on a computing system typically require a window or viewer. In the context of web content, a web browser includes a user interface that includes a viewer and that allows users to request and view (through the viewer) web content on different websites. If content of a web page cannot fit within the viewer, then the web browser includes one or more scrollbars that enable a user to view all the content. A scrollbar in web browser interfaces typically appear along a right or left side of the web interface when the amount of vertical web content exceeds the viewable area of the viewer. Similarly, a scrollbar may appear along a top or bottom side of the web interface when the amount of horizontal web content exceeds the viewable area of the viewer. A scrollbar typically includes a track, arrow controls (or "arrows") and a thumb control (or "thumb") that is movable along the track to view web content. A thumb is typically represented by a highlighted area that may be moved on the track to bring web content into the viewable area of a display. The position of the thumb in the track dictates the portion of the web content in the viewable area of a display.

A different type of digital content application is a diagramming application, which allows users to not only view diagrams, but to create and modify them. Diagrams may include numerous (e.g., hundreds or thousands of) objects, such as nodes/vertices and edges. Diagramming applications have navigation controls that do not include scrollbars. This is because scrollbars are only used to show digital content and scrollbars are designed to end where the content ends. However, the content in diagrams is constantly changing and is often expanding in multiple directions. Thus, in diagramming, the content is very dynamic with respect to size changes. In contrast, web content is static in that the location of web content does not change (nor is web content added) while a user is viewing the web content in a web browser.

To address this dynamic nature of diagram creation and modification, diagramming applications typically include a miniature view of the content for navigating a diagram. The miniature view (or "mini-view") is a smaller version of the diagram. For example, an object in the mini-view may be one tenth the size of the corresponding object in the main view (or content display area) of the diagram. The mini-view includes a box that bounds the area of the smaller version of the diagram that corresponds to the portion of the diagram that is currently displayed in the main viewer. Each object, in the mini-view, that is within the box has a corresponding object in the main viewer. In contrast, each object, in the min-view, that is outside that box does not have a corresponding object in the main viewer.

One disadvantage of the mini-view is that as the amount of content in a diagram increases (e.g., through the addition of objects to the diagram and/or through the increase of size of objects already in the diagram), the mini-view becomes less useful. As the amount of content increases in a diagram, because the mini-view remains the same size, the box that represents the viewable area in the main viewer becomes smaller. Small movements of the box results in large changes in what is displayed in the main viewer, oftentimes too much change. At a certain point, the box is so small that it becomes unviewable and possibly even unselectable. Therefore, the utility of the mini-view greatly diminishes for navigation purposes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram of a basic software system that may be employed for controlling the operation of the computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments herein provide navigation options for a user interface directed to interactive content management of an interactive displayable area, such as within a diagram application and the like. In embodiments, a method and user interface for a user scrollable display, such as an interactive diagram, includes displaying content that extends beyond a presentation area of the user interface. The user interface for a diagram or other graphical content according to embodiments allows extending the diagram beyond a boundary of a content area (that encapsulates the content of the diagram) by employing a scrolling control with certain features.

The scrolling control may include a scrollbar track, a thumb, and a pair of arrow controls on one or both sides of the track. The scrolling control allows users to view content within a defined boundary that encapsulates a set of objects, such as all presentable objects of the diagram. In response to user input to view an area outside of the defined boundary, the scrolling control (or elements thereof) changes in visual appearance. For example, the thumb and arrows may disappear or the thumb may become transparent or translucent. Additionally, a message may appear that the scrolling control appearance may revert to its previous appearance in response to specific input, such as input that selects any element of the scrolling control or a track of the scrolling control.

In a related technique, an interactive diagram user interface includes a scrolling control and a miniature view that may be used individually to navigate among content of a diagram. The miniature view visually depicts all presentable objects of a diagram and includes a box that indicates which of those objects are inside a content display area and which are outside the content display area. User input to move an element of the scrollbar causes the box to move and vice versa. For example, moving a thumb or arrow of the scrollbar causes the box to move.

Embodiments improve interactive displays that allow users to easily navigate among all the objects of a diagram, regardless of the size of those objects and the number of those objects. Thus, very large diagrams may be navigated without requiring an excessive number of inputs.

Example User Interface

Figure 1:
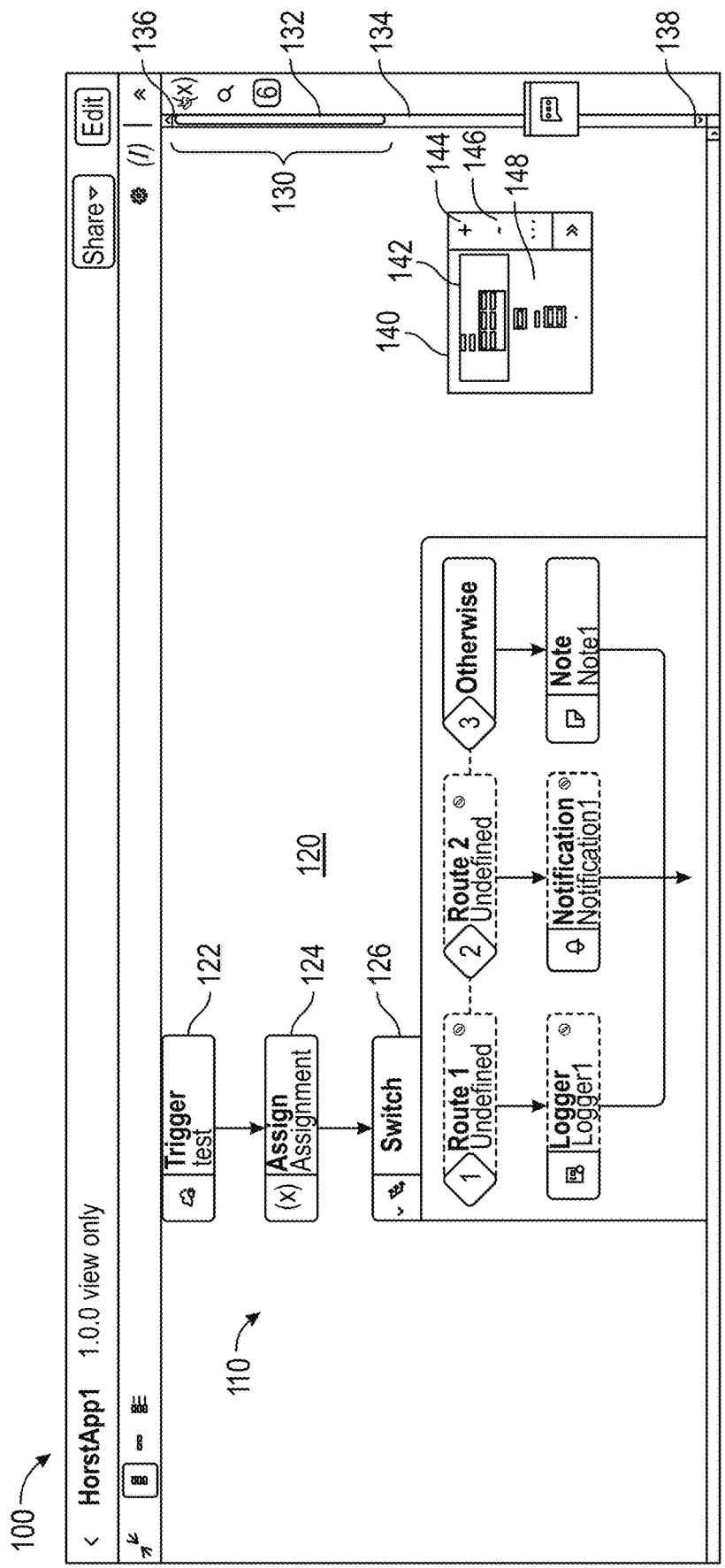
FIG. 1 is a screenshot of an example user interface of a software application that presents, through the user interface, contents of a diagram and includes navigation controls for viewing those contents, in an embodiment.

FIG. 1 is a screenshot of an example user interface 100 of a software application that presents, through user interface 100, contents of a diagram and includes navigation controls for viewing those contents, in an embodiment. User interface 100 includes a portion of a diagram 110 that is presented in content display area 120. The portion includes objects 122-126, where object 126 itself comprises multiple objects.

In this example, objects are linked to each by directional lines, or lines with arrows. (Although not labeled as objects, lines that connect two-dimensional objects may be considered objects.) A diagram may be a flowchart, a business relationship diagram, a data object relationship diagram, a software design diagram, etc. However, embodiments are not limited to these types of objects or to the diagramming context. Thus, although the following description is in the context of interactive diagrams, embodiments are applicable to any software application where content is displayed, the content cannot fit within a content display area, and the area occupied by the content may be expanded based on user input. (An "interactive diagram" is a diagram that is displayed or presented and modifiable by a user during presentation of the diagram, such as causing the number of objects in the diagram to change or causing the relative positions of objects within the diagram to change.)

The software application that presents user interface 100 includes multiple components, each configured to perform a different function or set of operations. The software application has access to a (e.g., diagram) file that contains (or references) a database of (digital) objects that are used to present objects of a diagram. An object has a shape (e.g., a line, circle, square, rectangle, cube), one or more colors (e.g., black, gray, red, etc.), one or more lengths given a default zoom setting (e.g., a height and a width, or just a single length for a line), a thickness (e.g., in number of pixels) of one or more lines in the object, and spatial data that indicates a position of the object in the corresponding diagram or among all the presentable objects associated with the file. The spatial data may include an absolute position and/or relative position that is relative to one or more other objects. Spatial data of an object may change as the object is moved and/or as other objects are placed around the object. An object may comprise multiple objects. An object may be an image, such as a .gif image or a .jpeg image. Embodiments are not limited to the type of object that may be included in a diagram and presented on a screen of a computing device.

One component of the software application is a presentation component that accesses objects "in" (or referenced by) a (diagram) file. The presentation component reads a file, determines how to present the objects associated with that file, and presents zero or more of the objects within content display area 120 of user interface 100. The presentation component determines what to present in content display area 120 based on one or more inputs, such as a size of content display area 120 or of user interface 100 on a screen of a computing device, a current zoom setting, and movement instructions that are received through user interface 100 (e.g., one or more navigation components thereof) based on user input. For example, selecting a right arrow key on a keyboard may cause objects in content display area 120 to move to the left a certain number of pixels. The certain number may change depending on the current zoom setting level and/or the size of the screen of the computing device. The inputs that presentation component receives may be from one or more navigation components (e.g., a scrolling component or a mini-view component), as described in more detail herein.

Other portions of diagram 110 cannot fit within content display area 120. One UI view tool of user interface 100 may include a zoom control that, given user input, may allow the user to increase the size of presented objects in content display area 120 and/or decrease the size of presented objects in content display area 120. Thus, with one or more inputs (through the zoom control) to zoom out, the entirety (or all of the content) of diagram 110 may fit within content display area 120. If the number of objects in diagram 110 is relatively large, then zooming out may cause the presented objects to lose significant resolution and some objects (e.g., lines or other small objects) may disappear altogether.

In an embodiment, a user provides input to adjust what is presented in content display area 120 of user interface 100. Such input may be received by using a cursor control device (e.g., a mouse) to select a position or point within visual area 120 and, while the position or point is selected, move the cursor control device. For example, if movement of the cursor control device is to the left, then objects within content display area 120 shift or move to the left, which may result in some objects moving out of content display area 120 and/or some objects to move into content display area 120.

Additionally or alternatively, user input to adjust what is presented in content display area 120 may be received by the user touching a portion of a touchscreen with a finger, where the portion is anywhere in content display area 120. Then, while touching the touchscreen, the user moves his/her finger in a direction and objects within content display area 120 move in the same direction, which may cause (1) some objects that were within (or inside) content display area 120 to move outside of content display area 120 and (2) (1) some objects that were outside content display area 120 to move within (or inside) content display area 120.

Diagram Boundary

In an embodiment, the presentation component determines a boundary (or "diagram boundary") around objects of a diagram, where the boundary encompasses or surrounds all presentable objects in the diagram. The top boundary may be defined as the top edge of the top-most object in a diagram, the left boundary may be defined as the left-most object in the diagram, and so forth. Thus, the diagram boundary may be a rectangle. The area of the diagram within the diagram boundary may be referred to as a "content bounding region." Thus, the diagram boundary encapsulates the content bounding region.

In FIG. 1, the top edge of object 122 defines the top edge of the diagram's content bounding region. Therefore, the top edge of content display area 120 represents a portion of the top edge of the diagram boundary.

A user utilizing user interface 100 may desire to make changes to a diagram that causes the content bounding region to be expanded and, thus, causes the diagram boundary to increase in size. For example, a user may desire to add a new object to the diagram, where the new object is added to a location that is outside of the diagram boundary. As a specific example, the user adds a new object that is located above the top-most object in the diagram, or that is located to the left of the left-most object in the diagram. As another example, a user may provide input (e.g., through user interface 100) to move an existing object to a location that is outside the diagram boundary. As another example, a user may provide input (e.g., through the user interface) to increase the size of an existing object that has an edge that is on or near on the diagram boundary, causing at least a portion of the existing object to cross the diagram boundary.

Scrolling Component

In addition to the presentation component, the software application includes a scrolling component that communicates with the presentation component and one or more other components of the software application. The scrolling component includes a scrollbar UI control 130 that is presented in user interface 100. Scrollbar UI control 130 comprises a thumb 132, a track 134, and arrows 136, 138. Arrows 136, 138 are at the opposite ends of track 134. In another embodiment, arrows 136, 138 are on the same side of track 134.

User input that moves thumb 132 within track 134 may comprise using a cursor control device (e.g., a mouse) to select thumb 132 and, while thumb 132 is selected (e.g., using a button of the cursor control device), move the cursor control device, which causes thumb 132 to move accordingly. A computing device (e.g., a laptop computer, a desktop computer, or a table computer) that executes the software application that presents user interface 100 may include settings that allow the user to adjust how responsive selected objects are to movement of the cursor control device. For example, relatively small movements of the cursor control device may result in relatively large movements, of a selected UI object or a digital cursor, on a screen of the computing device. Alternatively, relatively large movements of the cursor control device may result in relatively small movements of the selected UI object or the digital cursor.

Another way in which a user may provide input to move thumb 132 may comprise a finger of the user touching a portion of a touchscreen of a computing device, where the portion includes a portion of thumb 132. Touching and holding the portion of the touchscreen causes thumb 132 to be selected (or to be in a selected/movable state) and then, while thumb 132 is selected, the user moves his/her finger to another portion of the touchscreen, such as over another portion of track 134.

Another way in which a user may provide input to move thumb 132 may comprise the user selecting a point (e.g., whether with a cursor control device or with the user's finger) within track 134 where thumb 132 is not located. The amount of movement of thumb 132 based on such input may be the length of thumb 132. Alternatively, selecting a point within track 134 may involve moving the closest edge of thumb 132 to that point.

Another way in which a user may provide input to move thumb 132 may comprise the user selecting certain keys on a keyboard, whether physical keys or software keys. For example, selecting an up arrow key on the keyboard may cause thumb 132 to move up track 134 while selecting a down arrow key on the keyboard may cause thumb 132 to move down track 134.

Another way in which a user may provide input to move thumb 132 may comprise the user selecting one of arrows 136, 138, such as through a touchscreen or using a cursor control device. In an embodiment, selection of one of arrows 136, 138 causes objects in content display area 120 to shift a fixed number of pixels, such as ten pixels. Such an embodiment is helpful, especially for large diagrams where moving thumb 132 directly may cause significant changes in what is presented in content display area 120.

User input to move thumb 132 may be limited in that if thumb 132 is already at an edge of track 134, then further user input to move thumb 132 in the direction of the edge (e.g., in selecting one of arrows 136, 138 or in moving thumb 132 directly) may be ignored.

In response to user input to move thumb 132, the scrolling component determines how much thumb 132 has moved (and which direction) and sends, to the presentation component, a message that indicates that information (e.g., distance and/or direction). In response to receiving the message, the presentation component uses that information to adjust content display area 120. Such adjustment may involve determining a new position for each object that is in the content display area 120 and a new position of each object that might appear in the content display area 120. Conversely, user input to the presentation component (or a UI control thereof) (e.g., user input that "drags" a location of content display area 120 in a certain direction for a number of pixels) causes the presentation component to generate and send a message to the scrolling component, which determines how much to move thumb 132 along track 134. Therefore, the presentation component and the scrolling component communicate with each other, such that user input that changes a UI control of one component affects a UI control of the other component.

In an embodiment, the scrolling component comprises two scrollbars (and, thus, two thumbs, two tracks, and a set of arrows for each track). For example, user interface 100 includes a vertical scrollbar UI control and a horizontal scrollbar UI control. The scrolling component of the software application may receive information about scrolling from two different scrollbar UI controls, one for each scrollbar. Thus, the scrolling component receives data from multiple scrolling UI controls, processes the data to generate a message, and sends the message to the presentation component.

Miniature View

One of the optional navigation controls of user interface 100 is a miniature view 140 that depicts the entirety (or all) of the content of diagram 100, including content that is not presented in content display area 120. Miniature view 140 includes a mini-content area 148 that depicts miniature versions of all (or at least some of) the content of diagram 100, including content that is not presented in content display area 120. (Some objects, such as lines or very small two-dimensional objects, may be so small that it is impossible to accurately present such objects in miniature form in mini-content area 148.)

In an embodiment, mini-content area 148 visually indicates the boundary of diagram 110. In this embodiment, mini-content area 148 visually indicates an area that is outside the boundary of diagram 110. For example, the shading of the area outside of the boundary is different than the shading of the area inside of the boundary. This boundary indication in min-content area 148 allows a user to navigate to and visually comprehend that area of the diagram that is outside the boundary and that does not have objects yet. As a user creates objects (or moves existing objects of diagram 110) to include in an area that is outside the boundary, mini-content area 148 is updated to indicate those changes, such as expanding the shading that indicates which area of the diagram is inside the boundary.

Miniature view 140 includes a box 142 that indicates which portion of diagram 100 is inside content display area 120 (i.e., content within box 142) and which portion of diagram 100 is outside content display area 120 (i.e., content outside box 142). A user may provide input that moves box 142 anywhere within content area 148. Such input may comprise the same type of input as is described herein for moving thumb 132, such as using a cursor control device, using a touchscreen, and using one or more keys of a keyboard. Additionally, user input to move box 142 may be limited in that if box 142 is already at an edge of content area 148, then further user input to move 142 in the direction of the edge may be ignored.

Miniature view 140 also includes zoom controls 144 and 146. Zoom in control 144 allows a user to zoom in on the portion of diagram 100 that is currently presented in content display area 120. A result of user input that selects zoom in control 144 is that objects in content display area 120 will either increase in size, no longer appear in content display area 120 (e.g., because those objects were already near an edge of content display area 120), or partially appear inside and outside content display area 120. Conversely, zoom out control 146 allows a user to zoom out on the portion of diagram 110 that is currently presented in content display area 120. A result of user input that selects zoom in control 146 is that objects in content display area 120 will decrease in size. Also, zero or more other objects of diagram 110 that were not in content display area 120 before the user input will now appear (or partially appear) in content display area 120 (e.g., because those objects were previously just outside of content display area 120).

In an embodiment, the software application includes a mini-view component that communicates, to the presentation component, data that is based on user input that is relative to the mini-view component. For example, user input to move box 142 a certain number of pixels within miniature view 140 causes the mini-view component to send that data to the presentation component. In response, the presentation component updates content display area 120 accordingly. As another example, user input to select one of zoom controls 146, 148 causes the mini-view component to send, to the presentation component, data that indicates which zoom control was selected and, optionally, a current zoom level of content display area 120.

Similarly, user input relative to a location within content display area 120 (e.g., dragging a location within content display area 120), causes the presentation component to send, to the mini-view component, data that indicates, for example, a number of pixels that the user "dragged." The mini-view component updates the position of box 142 in miniature view 140 accordingly.

In an embodiment, user input relative to scrollbar control 130 (e.g., user input that moves thumb 132 along track 134) causes the scrolling component to send first data to the presentation component, which causes second data to be sent to the mini-view component, which updates box 142 in miniature view 140 accordingly. Similarly, user input relative to miniature view 140 causes the mini-view component to send first data to the presentation component, which causes second data to be sent to the scrolling component, which updates scrollbar control 130, such as thumb 132 and, optionally, one of arrows 136, 138. In either scenario, the presentation component may generate the second data based on the first data, but the second data is not identical to the first data.

The first data may be a number of pixels that a corresponding UI element (e.g., thumb 132 or box 142) has moved. Alternatively, the first data may be a percentage of a total length (and/or total width) that the corresponding UI element has moved. Similarly, the second data may be a number of pixels for a UI element of the destination component to move or a percentage of a total length (and/or total width) for the UI element of the destination component to move.

Viewing Outside the Boundary

A user utilizing user interface 100 may desire to view a portion of a diagram that is outside the diagram boundary. This is useful when the user has in mind certain changes that will affect an area outside the diagram boundary and how those changes relate to objects inside the diagram boundary.

A user may provide one of multiple types of input to view a portion of a diagram that is outside the diagram boundary ("outside portion"). For example, a user may drag content display area 120 with a cursor control device or with a finger, causing content display area 120 to present an outside portion. As another example, a user may drag box 142 to include an area of content area 148 that corresponds to an outside portion. As another example, a user may drag thumb 132 beyond an edge of track 134 (since track 134 represents a length of the diagram boundary in one dimension). Initially, thumb 132 might not move beyond an edge of track 134; however, continued movement beyond an edge of track 134 might signal, to the software application, the user's intention to view an outside portion. As another example, a user may select arrow 136 when the top edge of thumb 132 is at the top edge of track 134. Each of the above inputs indicate the user's intention to view an outside portion.

In an embodiment, in response to user input that indicates the user's intention to view an outside portion, scrollbar UI control 130 changes in visual appearance. For example, one or more elements of scrollbar UI control 130 disappear, such as thumb 132 and/or arrow 134. As another example, one or more elements of scrollbar UI control 130 become transparent, such as thumb 132 and arrows 136, 138. As another example, every pixel of thumb 132 changes in color (e.g., becomes white) except for the border of thumb 132.

Figure 2:
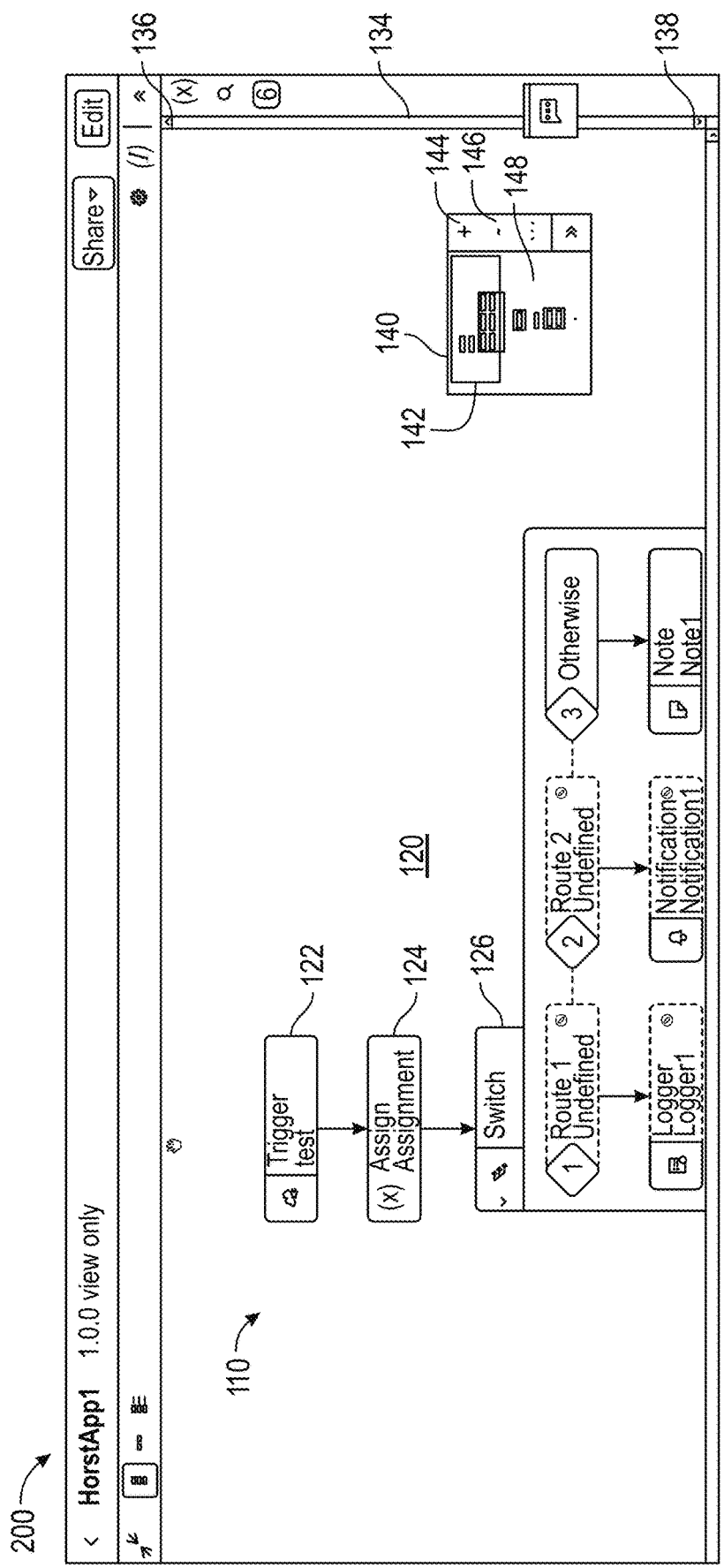
FIG. 2 is a screenshot of an example user interface that depicts a change in visual appearance of a scrollbar control, in an embodiment.

FIG. 2 is a screenshot of an example user interface 200 that depicts a change in visual appearance of scrollbar control 130, in an embodiment. User interface 200 is similar to user interface 100 and that is a result of user input to move content display area 120 such that a portion of diagram 110 that is outside the content bounding region is presented in content display area 120. Also, as a result of the user input, objects 122-126 in user interface 200 are shifted downwards relative to objects 122-126 in user interface 100. Another difference between user interface 100 and user interface 200 is that thumb 132 is not depicted in user interface 200; in other words, thumb 132 disappeared as a result of the user input.

Additionally, as a result of the user input that causes content display area 120 to display an outside portion, one or more messages may be displayed through user interface 200. The one or more messages may appear on or adjacent to track 134 and/or near the edge of track 134 that corresponds to the portion of the diagram boundary that was crossed.

One message may indicate that the visual appearance of one or more elements of scrollbar control 130 has changed, thus, notifying the user of the change. This message may indicate what the specific change was, such as disappearance of thumb 132. This message may indicate that scrollbar control 130 has become deactivated. Another message (or one of the same messages above) may indicate that content display area 120 displays an outside portion.

Another message (or one of the same messages above) may indicate that the one or more elements (that disappeared) will reappear (or that became transparent will no longer be transparent), in response to certain user input to user interface 100. The certain user input (e.g., using a cursor control device) to undo the change in visual appearance in scrollbar UI control 130 may be relative to a portion of content display area 120 (e.g., dragging content display area 120), to a transparent/translucent version of thumb 132, or to a portion of track 134. The certain user input also causes content display area 120 to return to a view of diagram 110 where only portions of diagram 110 that are within the content bounding region are presented in content display area 120.

A hybrid embodiment is where the user interface includes a miniature view in addition to the embodiment where the visual appearance of scrollbar control 130 changes when displaying a portion of a diagram that is outside a diagram boundary. The hybrid embodiment provides the user multiple benefits: (1) the benefit of the miniature view, which allows for quick navigation for small to medium-sized diagrams; and (2) the benefit of scrolling for large diagrams.

Example Process

Figure 3:
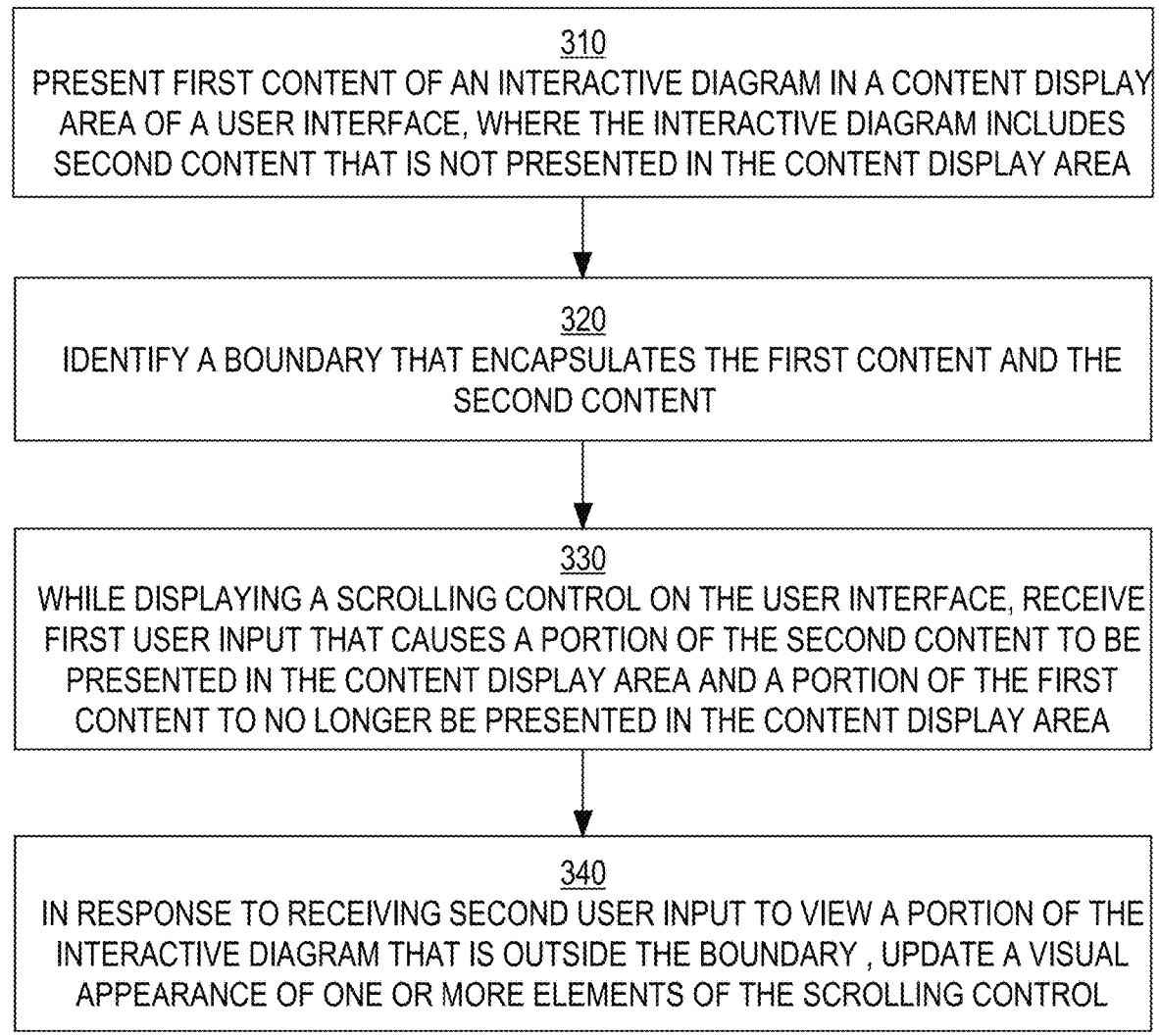
FIG. 3 is a flow diagram that depicts an example process for navigating a diagram, in an embodiment.

FIG. 3 is a flow diagram that depicts an example process 300 for navigating a diagram, in an embodiment. Process 300 may be performed by one or more components of a software application that presents a user interface (e.g., user interface 100) that is used to navigate the diagram.

At block 310, first content of an interactive diagram is presented in a content display area of a user interface. The interactive diagram includes second content that is outside the content display area of the user interface. An example of the user interface is user interface 100, an example of the interactive diagram is diagram 110, and an example of the content display area is content display area 120. Block 310 may be performed by a presentation component of the software application.

At block 320, a boundary that encapsulates the first content and the second content is identified. The boundary may be updated in response to certain changes in location of objects within the first content and/or the second content and changes in number of objects. Block 320 may be performed by the presentation component of the software application.

At block 330, while displaying a scrolling control on the user interface, first user input is received that causes a portion of the second content to be presented in the content display area and a portion of the first content to no longer be presented in the content display area. Block 340 may involve the user dragging a location within the content display area, selecting arrow keys on a keyboard, dragging a thumb of a scrolling control, or selecting a location on a track of the scrolling control. The display of the scrolling control may be performed by a scrolling component of the software application while the first user input may be received by the presentation component or the scrolling component.

At block 340, in response receiving second user input to view a portion of the interactive diagram that is outside the boundary, a visual appearance of one or more elements of the scrolling control is updated. Block 340 may involve causing the thumb and, optionally, the track of the scrolling control to disappear or become translucent. Block 340 may also involve displaying a message that indicates that the visual appearance has changed, a message that indicates that the content display area is displaying a portion of the diagram that is outside the content bounding region, and/or a message that indicates what action(s) the user can perform so that the content display area a portion of the diagram that is inside the content bounding region.

Process 300 may further comprise receiving third user input that causes the content display area to only present content that is within the identified (diagram) boundary. The third user input causes the visual appearance of the one or more elements of the scrolling control to return to its previous appearance. For example, the thumb may reappear, if the thumb disappeared in response to the second user input.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
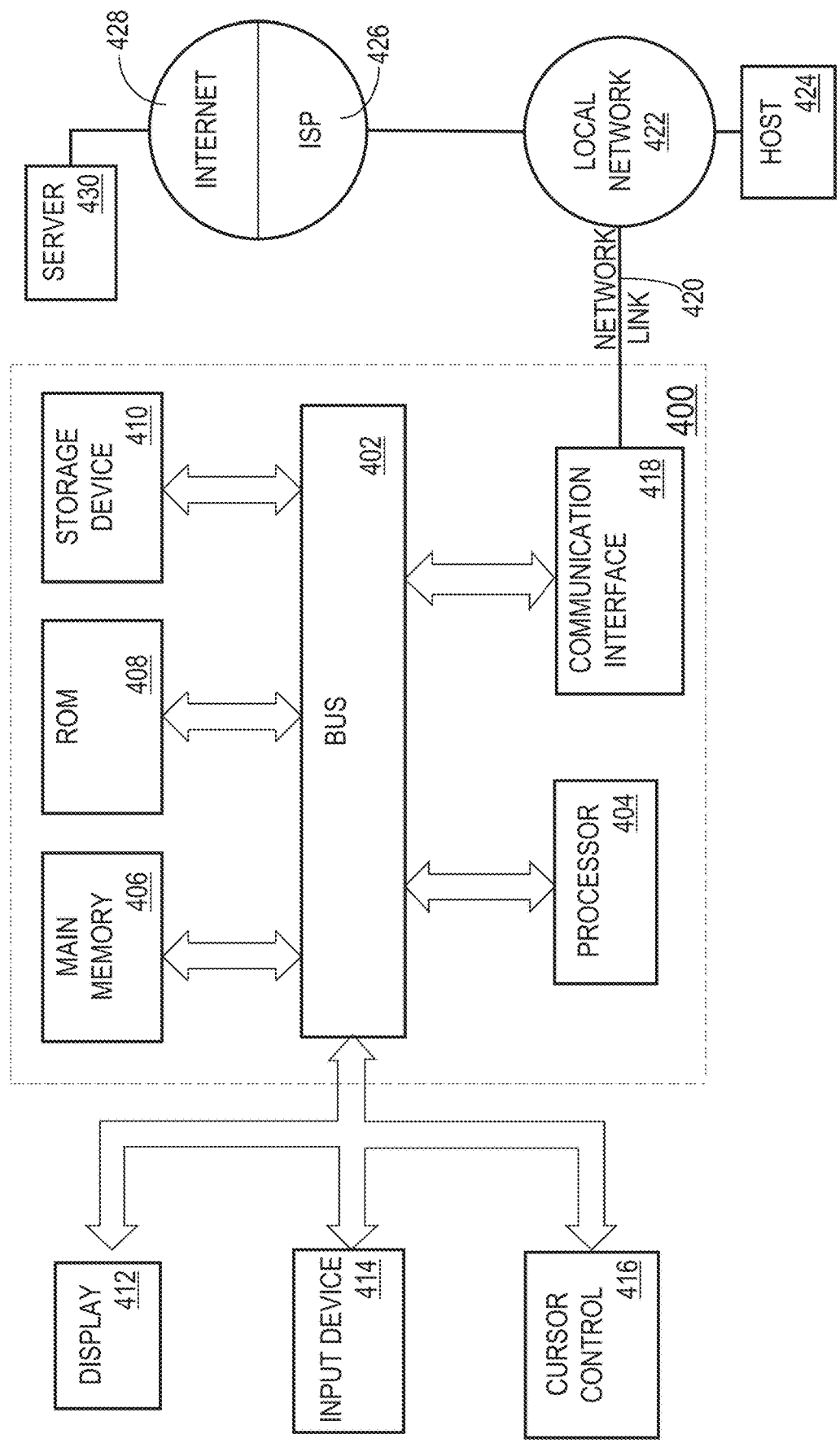
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   presenting, in a content display area of a user interface, a first content of an interactive diagram, wherein the interactive diagram includes a second content that is outside the content display area of the user interface, wherein the interactive diagram is user-modifiable during presentation;
   identifying a boundary that surrounds the first content and the second content, wherein the interactive diagram includes a viewable portion of the interactive diagram that is entirely outside the boundary;
   while displaying a scrolling control on the user interface, receiving first user input that causes a portion of the second content to be presented in the content display area and a portion of the first content to no longer be presented in the content display area; and in response to receiving second user input to view the viewable portion of the interactive diagram that is outside the boundary, updating a visual appearance of one or more elements of the scrolling control;

wherein the method is performed by one or more computing devices.

2. The method of claim 1, wherein updating the visual appearance of the one or more elements of the scrolling control comprises causing the one or more elements of the scrolling control to disappear.

3. The method of claim 2, further comprising, in response to receiving the second user input, updating the visual appearance to indicate that the one or more elements of the scrolling control will reappear in response to additional user input in a particular portion of the content display area.

4. The method of claim 1, wherein updating the visual appearance of one or more elements of the scrolling control comprises causing the one or more elements of the scrolling control to become transparent.

5. The method of claim 1, wherein the scrolling control includes a track, a thumb, and an arrow.

6. The method of claim 5, wherein the second user input includes input relative to the thumb that moves the thumb past an edge of the track.

7. The method of claim 5, wherein the second user input includes input relative to the arrow when the thumb is at an edge of the track, wherein input relative to the arrow would move the thumb outside of the track if the thumb was able to move outside the track.

8. The method of claim 5, wherein each user input that selects the arrow causes content that is in the content display area to be adjusted by a fixed number of pixels in a particular direction that corresponds to a direction of the arrow.

9. The method of claim 1, wherein the second user input comprises selection, using a cursor, of a location in the content display area and moving the cursor while the cursor is selected.

10. The method of claim 1, wherein the one or more elements of the scrolling control has a first type of visual appearance prior to receiving the second user input, wherein the one or more elements of the scrolling control has a second type of visual appearance in response to receiving the second user input, the method further comprising:

in response receiving third user input to view only portions of the interactive diagram that are inside the boundary, updating the visual appearance of one or more elements of the scrolling control to have the first type of visual appearance.

11. The method of claim 10, wherein the one or more elements include a track and the third user input is a selection of a location within the track.

12. The method of claim 1, further comprising:

presenting, on the user interface, a miniature view of the interactive diagram, wherein the miniature view includes a depiction of a plurality of objects that are within the boundary and that (1) includes one or more first objects that are inside of the content display area and (2) one or more second objects that are outside the content display area;

wherein the miniature view includes a box that corresponds to the content display area, wherein the one or more first objects are within the box and the one or more second objects are outside the box.

13. The method of claim 12, wherein the second user input is input relative to the box that moves the box, causing an element of the one or more elements of the scrolling control to move.

14. The method of claim 12, wherein the second user input is input relative to the scrolling control causes the box in the miniature view to move.

15. A method comprising:

presenting, in a content display area of a user interface, first content of an interactive diagram, wherein the interactive diagram includes second content that is outside the content display area, wherein the interactive diagram is a diagram that is user-modifiable during presentation;

identifying a boundary that encapsulates the first content and the second content, wherein the interactive diagram includes a viewable portion of the interactive diagram that is outside the boundary, wherein the viewable portion of the interactive diagram that is outside the boundary does not include any user-modifiable content;

while presenting the first content in the content display area, presenting, on the user interface, a miniature view of the interactive diagram;

wherein the miniature view includes a depiction of a plurality of objects that are within the boundary and that includes (1) one or more first objects that are inside of the content display area and (2) one or more second objects that are outside the content display area;

wherein the one or more first objects correspond to the first content and the one or more second objects correspond to the second content;

wherein the miniature view includes a box that corresponds to the content display area, wherein the one or more first objects are within the box and the one or more second objects are outside the box;

while presenting the miniature view, presenting, on a display, a scrollbar that comprises a plurality of elements that includes a thumb and a track;

in response to receiving a first input that adjusts which portion of the interactive diagram is presented in the content display area, causing the box to move in the miniature view and causing the thumb to move on the display;

receiving second input to place third content into the viewable portion of the interactive diagram that is outside the boundary;

expanding the boundary that encapsulates the first content and the second content in response to receiving the second input;

wherein the method is performed by one or more computing devices.

16. The method of claim 15, wherein the first input is input relative to the box, wherein causing the thumb to move comprises:

sending, by a mini-view component that controls presentation of the miniature view, a first message to a presentation widget that controls what is presented in the content display area;

in response to the first message, generating and sending, by the presentation widget, a second message to a scrolling component that controls presentation of the scrollbar.

17. The method of claim 15, wherein the first input is input relative to the thumb, wherein causing the box to move comprises:

sending, by a scrolling component that controls presentation of the scrollbar, a first message to a presentation component that controls what is presented in the content display area;

in response to the first message, generating and sending, by the presentation component, a second message to a mini-view component that controls presentation of the miniature view.

18. The method of claim 15, wherein the first input is input relative to a location in a visible area of the display, wherein causing the box and the thumb to move comprises:
generating and sending, by a presentation component that controls what is presented in the content display area:
a first message to a scrolling component that controls presentation of the scrollbar;
a second message to a mini-view component that controls presentation of the miniature view.

19. One or more storage media storing instructions which, when executed by one or more computing devices, cause performance of the method recited in claim 1.

20. One or more storage media storing instructions which, when executed by one or more computing devices, cause performance of the method recited in claim 15.

* * * * *

UNITED STATES PATENT AND TRADEMARK OFFICE
CERTIFICATE OF CORRECTION

PATENT NO. : 12,353,700 B2  
APPLICATION NO. : 18/228577  
DATED : July 8, 2025  
INVENTOR(S) : Heistermann It is certified that error appears in the above-identified patent and that said Letters Patent is hereby corrected as shown below:

On the Title Page

Column 2, item [57], Lines 11-12, delete "response receiving" and insert -- response to receiving -- therefor.

In the Specification

In Column 9, Line 64, delete "response receiving" and insert -- response to receiving -- therefor.

In the Claims

In Column 15, Line 48, in Claim 10, delete "response receiving" and insert -- response to receiving -- therefor.

In Column 16, Line 46, in Claim 15, after "receiving" insert -- a -- therefor.

Signed and Sealed this  
Fourteenth Day of October, 2025

John A. Squires  
*Director of the United States Patent and Trademark Office*